(12) United States Patent
Schmidt

(10) Patent No.: US 8,068,939 B2
(45) Date of Patent: Nov. 29, 2011

(54) METHOD FOR THE OPERATION OF A WIND ENERGY PLANT

(75) Inventor: Gunnar Schmidt, Frankenborstel (DE)

(73) Assignee: Nordex Energy GmbH, Norderstedt (DE)

( * ) Notice: Subject to any disclaimer, the term of this patent is extended or adjusted under 35 U.S.C. 154(b) by 227 days.

(21) Appl. No.: 12/104,167

(22) Filed: Apr. 16, 2008

(65) Prior Publication Data

US 2009/0206605 A1   Aug. 20, 2009

(30) Foreign Application Priority Data

Feb. 16, 2008 (DE) .......................... 10 2008 009 585

(51) Int. Cl.
*G05D 11/00* (2006.01)
(52) U.S. Cl. ...................................... 700/297
(58) Field of Classification Search .................. 700/287, 700/290, 297, 298
See application file for complete search history.

(56) References Cited

U.S. PATENT DOCUMENTS

| | | | |
|---|---|---|---|
| 7,476,985 B2 * | 1/2009 | Llorente Gonzalez | 290/44 |
| 7,560,823 B2 * | 7/2009 | Schellings | 290/44 |
| 2006/0273595 A1 * | 12/2006 | Avagliano et al. | 290/44 |
| 2008/0195255 A1 * | 8/2008 | Lutze et al. | 700/291 |

FOREIGN PATENT DOCUMENTS

| | | |
|---|---|---|
| DE | 19926553 | 12/2000 |
| DE | 102004056254 | 6/2006 |
| DE | 10 2006 034 106 A1 | 12/2007 |
| EP | 2020506 | 2/2009 |

* cited by examiner

*Primary Examiner* — Albert Decady
*Assistant Examiner* — Chad Rapp
(74) *Attorney, Agent, or Firm* — Vidas, Arrett & Steinkraus, P.A.

(57) ABSTRACT

A method for the operation of a wind energy plant, with an operation management, which can preset a desired value for an electric variable of the wind energy plant to be generated; a wind measurement device, which can capture the wind direction and the wind velocity, and a control unit, on which the measured values for the wind velocity and the wind direction are present, and in which a maximum value for the turbulence intensity is filed, the following procedural steps proceed in the method: from a turbulence intensity depending on the wind direction, the control unit determines one or more sectors of critical wind directions, in which the turbulence intensity exceeds the maximum value for the turbulence intensity, the control unit generates a control signal for the operation management, in order to reduce the desired value of the electric variable to be generated when the measured wind direction is in a sector of the critical wind directions, and a determined characteristic value exceeds a predetermined maximum value for the characteristic value.

17 Claims, 3 Drawing Sheets

METHOD FOR THE OPERATION OF A WIND ENERGY PLANT

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a method for the operation of a wind energy plant with a control system, which presets a desired value for an electric variable of the wind energy plant to be generated.

From "Erneuerbare Energien May 2006", pages 39 to 43, the entire contents of which is incorporated herein by reference, it is known that the turbulence intensity depends on the location and the point in time of the measurement. The turbulence intensity is defined as the standard deviation $\sigma$ of the wind velocity, based on a mean value of the wind velocity. As a measure for the fluctuation of the wind velocity, the turbulence intensity depends on the topology of the location's surroundings, amongst others. The higher the surface roughness in the surroundings of the location, the higher is the turbulence intensity. Higher fluctuations in the wind velocity occur through unequal properties of the ground in the surroundings of the location, which can lead to an increase of the standard deviation $\sigma$ of the wind velocity. As a result, the turbulence intensity is increased by this. It is further known that additional variables, like weather conditions e.g., neighbouring wind energy plants and also the wave height, in offshore plants, have an influence on the turbulence intensity.

From DE 10 2006 034 106 A1, the entire contents of which is incorporated herein by reference, a method for the operation of a wind turbine is known. In the method, characteristic values for the turbulence are acquired via one or more external sensors. In the wind turbulence cited in the state of the art, it is dealt with a variable, which is according to [0039] depending on the rotor blade position. In [0073], a wind turbulence sensor is mentioned, which measures the turbulences generated on the rotor blade. The wind turbulence is not coincident with the turbulence intensity mentioned above, which depends on the location and the time of the measurement.

The present invention is based on the objective to ensure an operation of the wind energy plant, in which a desired value setting is reduced as rarely as possible without exposing the wind energy plant to unnecessary stresses.

BRIEF SUMMARY OF THE INVENTION

The method according to the present invention relates to the operation of a wind energy plant which features a control system, a measurement device and a control unit. The control system serves for the operation of the wind energy plant in general and can control or adjust the power generated by the wind energy plant by setting a desired value. The wind measurement device acquires wind direction and wind velocity. The measured values for the wind velocity and the wind direction are present on the control unit. The turbulence intensity is obtained as a quotient, namely the standard deviation of the wind velocity, divided by the mean wind velocity. The mentioned control unit does not have to be realized as a separate control unit in addition to the control system, but may be a constituent part of the control system. In the method according to the present invention, one or more sectors of critical wind directions are provided in the control unit, in which the determined turbulence intensity exceeds the predetermined maximum value for the turbulence intensity. Based on the sector or the sectors, a control signal for the control system can be generated in order to reduce the desired value of the generated electric variable. The control signal for the control system is generated then when the measured wind direction is in a sector of the critical wind directions and a detected characteristic value exceeds a predetermined maximum value. In the method according to the present invention, a control signal for an operation with the reduced electric variable is generated when both conditions are fulfilled. The one condition relates only to the wind direction and requires that the actual value of the wind direction is in a sector of the critical wind directions. The second condition, which has to be fulfilled too, relates to a characteristic value which is actually determined. In the second condition, it is examined whether the characteristic value exceeds the predetermined maximum value. In this, the dependence of the characteristic value from the actual wind velocity is only one possibility to determine the characteristic value, even other characteristic values of the wind energy plant can be taken into account, the activity of a controller or an actually calculated turbulence intensity, for instance.

The method according to the present invention offers the advantage that a reduction of the electric variable generated by the wind energy plant always takes place depending on the wind direction. This approach is based on the finding that due to the topology of the location, fluctuations of the wind velocity can have different effects in the one and in the other wind direction, and must therefore taken into account differently when throttling the operation.

Preferably, the activity of the pitch controller can be analyzed in order to determine the characteristic value. Even in this embodiment, the actual value for the controller's activity is compared with a preset maximum value for the controller's activity. In this, the controller's activity may be the covered amplitude change per unit time or the frequency of the controller interventions.

In one possible embodiment of the method according to the present invention, the sector or the sectors of critical wind directions of the control unit are preset. For instance, this may take place by mapping a location for the wind energy plant, and the distribution of the turbulence intensity depending on the wind direction is analyzed. The sector or the sectors of critical wind directions determined in this way can then be filed in a control unit.

Alternatively, it is also possible that the control unit calculates from a turbulence intensity depending on the wind direction the sector or the sectors of critical wind directions, in which the detected turbulence intensity exceeds a maximum value for the turbulence intensity. The method can be performed continuously or at defined time intervals.

In one preferred extension of the method according to the present invention, the control unit analyzes the wind velocity as a characteristic value. Thus, in this embodiment of the method, it is examined whether the wind direction is in the sector of the critical wind directions and whether the wind velocity exceeds a preset maximum value.

In an alternative embodiment, the control unit calculates the turbulence intensity as a characteristic value from the measured values of the wind velocity and the associated wind direction. In this embodiment of the method according to the present invention, it is examined for a wind direction which is in a sector of critical wind directions, whether the associated turbulence intensity exceeds a preset maximum value for the turbulence intensity.

In that embodiment of the method, in which the control unit determines the turbulence intensity continuously or at time intervals from the measured values for wind velocity and wind direction, the control unit can perform a continuous mean value calculation and/or a continuous calculation of the standard deviation. In this embodiment, a reduction of the desired value for the wind energy plant takes place in the case that the wind direction is in a sector of the critical wind directions and the actual turbulence intensity exceeds a maximum value for the turbulence intensity.

In a preferred extension of the method according to the present invention, further prerequisites can be stipulated for the throttled operation in addition. Thus, it may be provided that in addition to exceeding the maximum value for the turbulence intensity, even the real value of the wind velocity exceeds a maximum value. Also, it may be provided that in addition to exceeding a maximum value for the turbulence intensity, an additionally determined characteristic value for the tower head movement and/or tower head acceleration has to exceed a predetermined critical value in order to have the plant operated in a throttled operation, with a desired value for the electric variable which is reduced.

The electric variable is preferably the effective power generated by the wind energy plant. But even other electric variables are conceivable in addition, wherein a reduction of the electric variable leads to a reduction of the mechanical stress of the wind energy plant in the spirit of the invention.

In a preferred extension of the method according to the present invention, an actual value for the blade pitch angle of at least one rotor blade is also present on the control unit. In a preferred extension of the method according to the present invention, a change of the blade pitch angle is brought about solely or in addition in order to reduce the electric variable. In the change of the blade pitch angle, at least one of the rotor blades is turned more away from the wind, so that the torque taken up from the wind is reduced, and with this, the mechanical stress of the wind energy plant is reduced also.

BRIEF DESCRIPTION OF THE SEVERAL VIEWS OF THE DRAWINGS

Examples for the method according to the present invention are described in more detail in the following.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
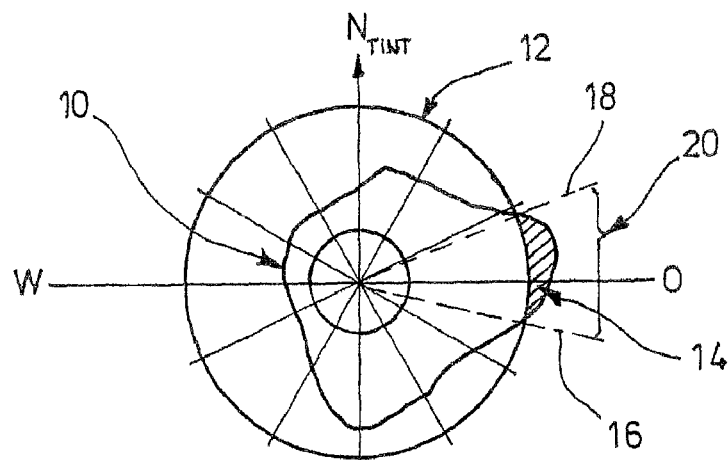
FIG. 1 shows the turbulence intensity at a location depending on the wind direction.

FIG. 1 shows a measured turbulence intensity for one location of the wind energy plant as a line 10, depending on the wind direction. In the chosen representation, the distance of a point on the line 10 from the center indicates the turbulence intensity present in this wind direction. A circle 12 is also drawn in FIG. 1, which presets a maximum turbulence intensity. The maximum turbulence intensity does not depend on the wind direction and thus it leads to a circle, so that the same distance from the center of the representation is present in each direction. In a region 14, which is represented as being shaded, the turbulence intensity 10 present at the site is greater than the maximum value 12 of the turbulence intensity. The intersection points of the turbulence intensity 10 with the maximum value of the turbulence intensity define two wind directions 16, 18 which delimit a sector 20 of critical wind directions. Roughly considered, the sector of the critical wind directions is in the eastern direction. This means that there are greater fluctuations of the wind velocity in the eastern wind direction, than in the wind from the remaining directions.

Figure 2:
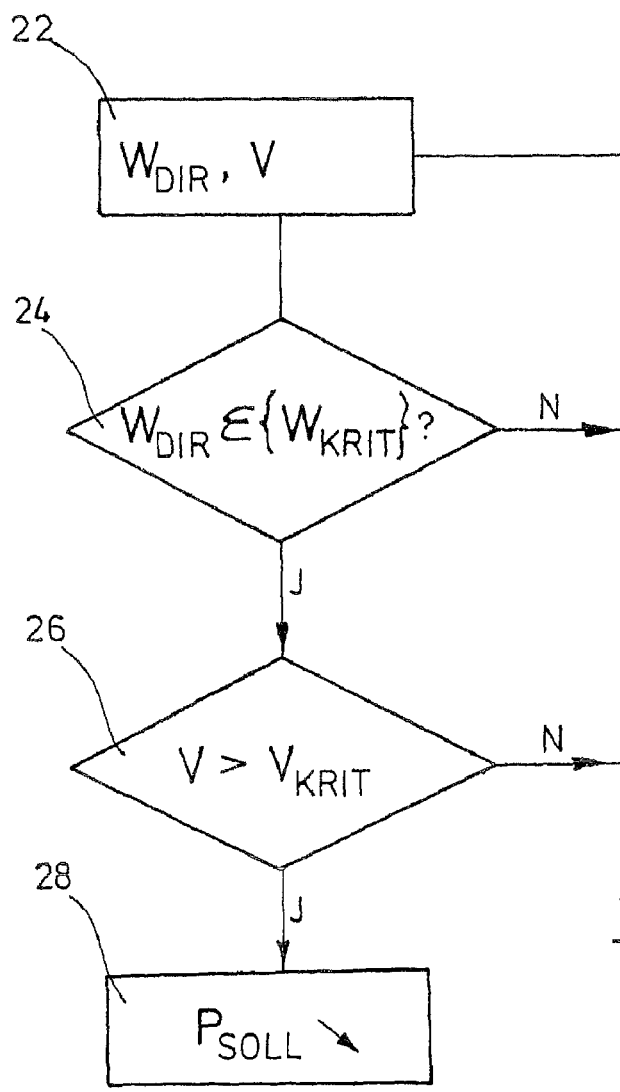
FIG. 2 shows a process diagram for a wind direction dependent intervention into the control system of the wind energy plant.

FIG. 2 describes the course of the method according to the present invention in a block diagram. In a step 22, the real value of the wind direction $W_{DIR}$ and that of the wind velocity v is measured. In step 24 it is examined for the measured wind direction whether it is inside the sector 20. For this purpose, it is examined in step 24 whether the measured wind direction $W_{DIR}$ is contained in the critical wind directions $\{W_{KRIT}\}$. In contrast to the example represented in FIG. 1, there may be even locations in which the critical wind directions are not only in a contiguous sector 20, but at which plural differently large sectors of critical wind directions are on hand. In the case that the wind direction corresponds to a critical wind direction, it is examined in step 26 in the method represented in FIG. 2, whether the real value of the wind velocity v is greater than a predetermined critical value for the wind velocity. In this case, the desired value presetting for the power is reduced in a subsequent step 28.

The process in FIG. 2 makes clear that a power reduction when exceeding a critical wind velocity is performed exactly then when the wind comes from a critical wind direction. Expressed in the reverse way, this means that even when the critical wind velocity is exceeded, no power reduction is performed when the wind direction does not stem from a critical wind direction. The consideration of the critical wind velocity in the context of the turbulence intensity must not be confounded with the critical wind velocity, which triggers a shut-down of the wind energy plant irrespective of the wind direction.

Figure 3:
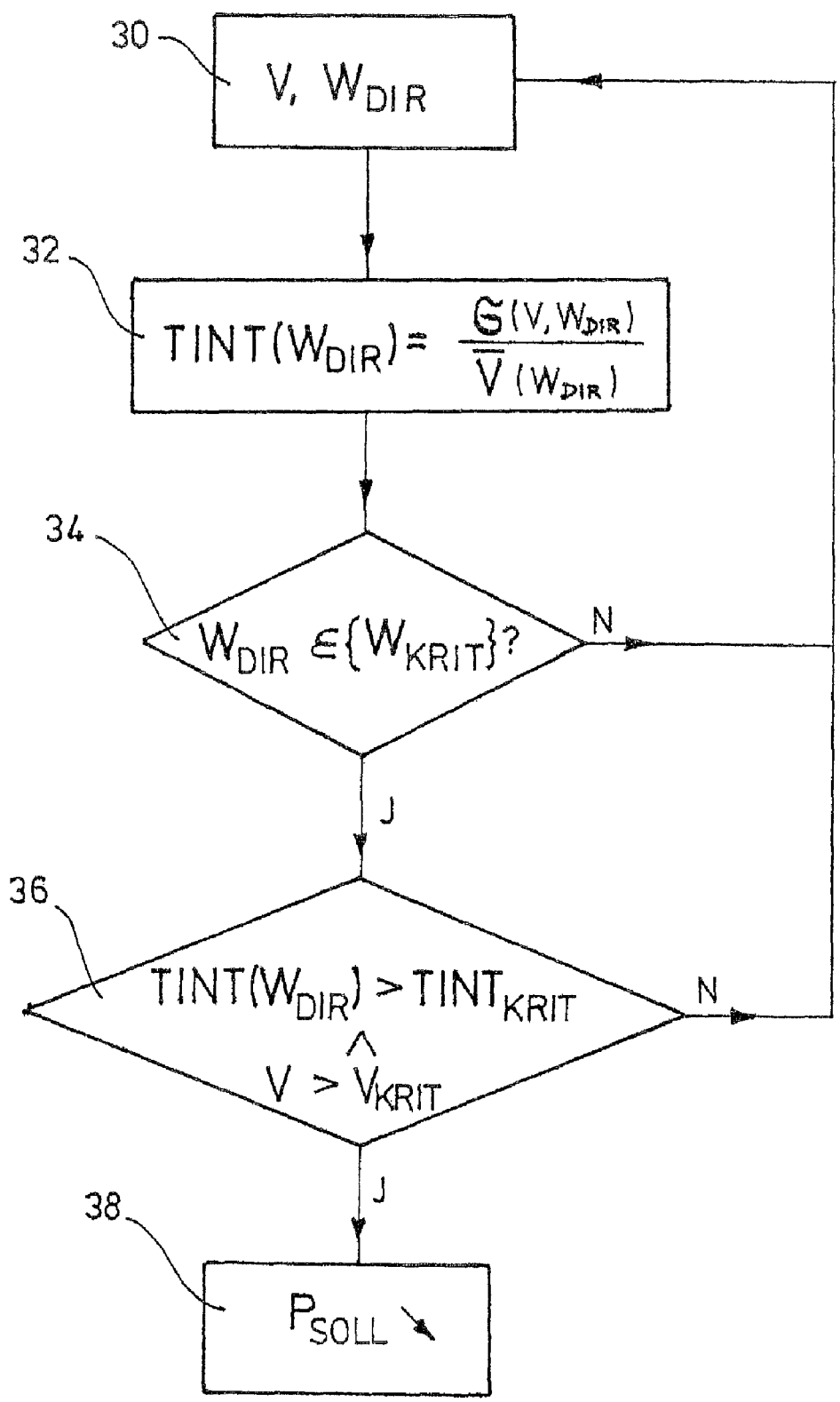
FIG. 3 shows a flow chart for a continuous analysis of the turbulence intensity.

FIG. 3 shows an alternative embodiment of the method according to the present invention, in which the wind direction $W_{DIR}$ and the wind velocity v are determined anew in step 30. In a subsequent step 32, the turbulence intensity $T_{INT}$ is calculated depending on the wind direction, $T_{INT}$(WDIR). As already mentioned, the turbulence intensity results as the quotient of the standard deviation of the wind velocity and the mean wind velocity. In the represented calculation step 32, the mean wind velocity is also taken into consideration depending on the wind direction. Alternatively, it is also possible to calculate a mean wind velocity, in which not only the wind velocities which occurred in the past are averaged, but in which there is also an averaging of the wind directions acquired in the past. In this averaging, the turbulence intensity depends on the wind direction only due to the direction dependence of the standard deviation.

In a subsequent step 34, it is examined anew whether the actual wind direction $W_{DIR}$ is contained in the set of the critical wind directions.

When the actual wind direction is a critical wind direction, two requirements are examined consecutively in step 36. The first requirement examines whether the turbulence intensity detected for the wind direction is greater than a critical turbulence intensity. As a matter of fact, in the conclusion that the wind direction corresponds to a critical wind direction, it had been already checked that the associated turbulence intensity is greater than the critical turbulence intensity. However, the occurring turbulence intensity does not only depend on the topology of the location, but also on weather conditions and other environmental influences. In off-shore plants, the wave height exerts an influence on the turbulence intensity also, for instance. Thus, with the first condition in the request 36, it is checked anew whether the actually calculated turbulence intensity is still critical. Thus, by doing so, in principle it is checked once again whether the wind direction is still in a critical sector.

As the second requirement, it is examined whether the wind velocity is greater than a critical wind velocity. When both requirements of the request 36 are fulfilled, a reduction of the desired value is triggered in step 38.

Figure 4:
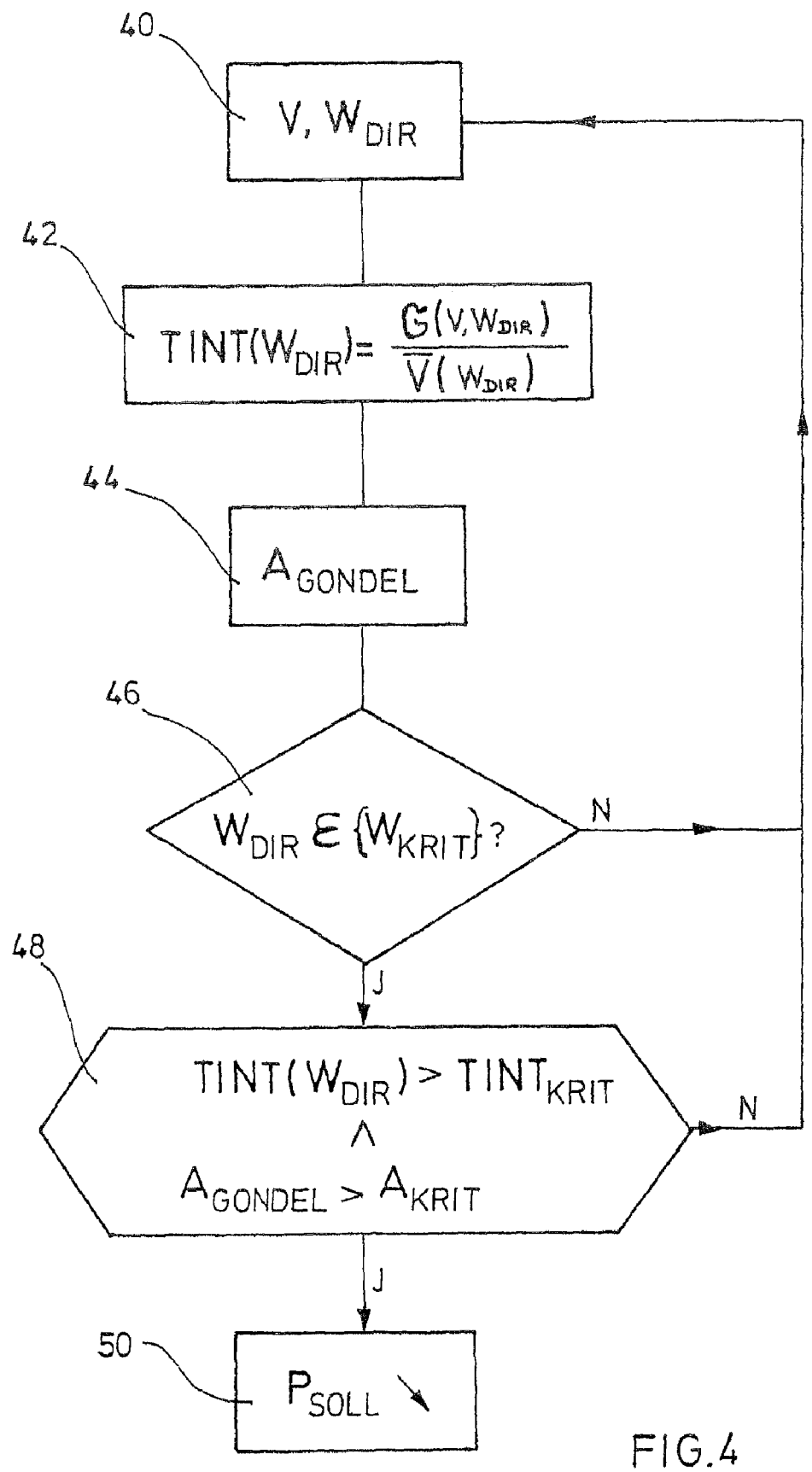
FIG. 4 shows an alternative embodiment for an analysis of the turbulence intensity.

FIG. 4 shows a further alternative embodiment of the invention, wherein wind velocity and wind direction are acquired in step 40. In step 42, a calculation of the turbulence intensity depending on the wind direction takes place anew. In step 44, a characteristic value $A_{GONDEL}$ for the stress of the wind energy plant is determined. In the characteristic value $A_{GONDEL}$ it may be dealt with characteristic values of a movement of the nacelle and/or of a movement of the tower of the wind energy plant, for instance.

In step 46, it is examined anew whether the actual wind direction belongs to the critical wind directions. In the procedural step 48, it is subsequently checked whether the actually determined value for the turbulence intensity is greater than a critical value for the turbulence intensity. In addition, it is checked whether even the actual value of the characteristic value $A_{GONDEL}$ is greater than a predetermined maximum value $A_{KRIT}$. In this case, when both requirements are fulfilled, a reduction of the desired value is triggered in step 50.

The methods above have been exemplified for the situation in which the sector of the critical wind directions has been determined once, by means of a recorded turbulence intensity for the location. In the method according to the present invention, it is also possible to adapt the sector boundaries continuously, based on the turbulence intensity calculated in the procedural steps 32 and 42, and to dynamically change the critical wind directions by doing so too. It is also possible to determine the turbulence intensity depending on the wind direction for a location again, by a complete measurement procedure at regular intervals.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for the operation of a wind energy plant, the wind energy plant comprising a control system which can preset a desired value for an electric variable of the wind energy plant to be generated; and a control unit, on which the measured values for the wind velocity and the wind direction are present, the method comprising:
   providing a wind measurement device for measuring a direction of wind and a wind velocity;
   providing at least one sector of critical wind directions to the control unit;
   determining if the measured direction of wind falls within the at least one sector of critical wind directions provided to the control unit;
   generating a control signal only when the measured wind direction is in one of the at least one sector of the critical wind directions and a determined characteristic value exceeds a predetermined maximum value for the characteristic value, the control unit providing the control signal to the control system in order to reduce the desired value of the electric variable to be generated.

2. The method according to claim 1, characterized in that the characteristic value is determined depending on the measured wind velocity and/or on a controller's activity.

3. The method according to claim 2, characterized in that the controller's activity of a pitch controller is detected for determining the characteristic value.

4. The method according to claim 1, characterized in that the at least one sector of critical wind directions of the control unit are preset.

5. The method according to claim 1, characterized in that the control unit determines the at least one sector of critical wind directions from a turbulence intensity depending on the wind direction, wherein the turbulence intensity exceeds a predetermined maximum value for the turbulence intensity in the at least one sector.

6. The method according to claim 1, characterized in that the control unit analyzes the wind velocity as a characteristic value.

7. The method according to claim 5, characterized in that the control unit calculates the turbulence intensity as a characteristic value from the measured values of the wind velocity and the associated wind directions.

8. The method according to claim 7, characterized in that the control unit calculates the turbulence intensity from the measured values of the wind velocity and of the wind direction continuously.

9. The method according to claim 5, characterized in that when the predetermined maximum value for the turbulence intensity is exceeded, the control unit generates the control signal for the control system only when the measured value of the wind velocity exceeds a predetermined maximum value.

10. The method according to claim 5, characterized in that when the maximum value for the turbulence intensity is exceeded, the control unit generates the control signal for the control system only when a characteristic value for tower head movement and/or acceleration exceeds a predetermined critical value.

11. The method according to claim 1, characterized in that the effective power is provided as the electric variable.

12. The method according to claim 1, characterized in that an actual value for the blade pitch angle is present on the control unit.

13. The method according to claim 12, characterized in that the reduction of the electric variable takes place solely or additionally by a change of the blade pitch angle of at least one rotor blade.

14. The method according to claim 1, further comprising:
   comparing the measured wind direction to the at least one sector of critical wind directions; and
   comparing a determined characteristic value to a predetermined maximum value for the characteristic value.

15. A method of operating a wind energy plant, the wind energy plant comprising a control system, a control unit, and a wind measurement device, the method comprising:
   determining at least one sector of critical wind directions, the at least one sector of critical wind directions being a region of wind directions where a measured turbulence intensity is greater than a predetermined maximum turbulence intensity;
   providing the at least one sector of critical wind directions to the control unit;
   measuring wind direction and wind velocity with the wind measurement device;
   determining whether the wind direction is in the at least one sector of critical wind directions;
   determining whether the measured wind velocity is greater than a predetermined critical value of wind velocity only when the wind direction is in the at least one sector of critical wind directions;
   determining a turbulence intensity, the turbulence intensity depending on wind direction and a mean wind velocity;
   determining whether the turbulence intensity is greater than a critical turbulence intensity; and
   providing a signal to the control system when the wind direction is in the at least one sector of critical wind direction, the turbulence intensity is greater than the critical turbulence intensity, and the measured wind velocity is greater than the critical wind velocity, wherein the control system reduces a desired value of an electric variable upon receiving the signal.

16. A method of operating a wind energy plant, the wind energy plant comprising a control system, a control unit, and a wind measurement device, the method comprising:
   determining at least one sector of critical wind directions, the at least one sector of critical wind directions being a region of wind directions where a measured turbulence intensity is greater than a predetermined maximum turbulence intensity;
   providing the at least one sector of critical wind directions to the control unit;
   measuring wind direction and wind velocity with the wind measurement device;
   determining whether the wind direction is in the at least one sector of critical wind directions;
   determining a turbulence intensity, the turbulence intensity depending on the measured wind direction;
   determining a characteristic value for the stress of the wind energy plant; and
   providing a signal to the control system only when the wind direction is in the at least one sector of critical wind direction, the turbulence intensity is greater than a critical turbulence intensity, and the characteristic value for stress is greater than a predetermined maximum value for stress, wherein the control system reduces a desired value of an electric variable upon receiving the signal.

17. A method of operating a wind energy plant, the wind energy plant comprising a control system, a control unit, and a wind measurement device, the method comprising:
   determining at least one sector of critical wind directions, the at least one sector of critical wind directions being a region of wind directions where a measured turbulence intensity is greater than a predetermined maximum turbulence intensity;
   providing the at least one sector of critical wind directions to the control unit;
   measuring wind direction and wind velocity with the wind measurement device;
   determining whether the wind direction is in the at least one sector of critical wind directions;
   determining a turbulence intensity, the turbulence intensity depending on the measured wind direction;
   determining a characteristic value for the stress of the wind energy plant;
   providing a signal to the control system only when the wind direction is in the at least one sector of critical wind direction, the turbulence intensity is greater than a critical turbulence intensity, and the characteristic value for stress is greater than a predetermined maximum value for stress, wherein the control system reduces a desired value of an electric variable upon receiving the signal, and
   further characterized in that the control unit determines the at least one sector of critical wind directions during operation of the wind energy plant.

* * * * *